(12) United States Patent
De Felice

(10) Patent No.: US 12,695,402 B2
(45) Date of Patent: Jul. 28, 2026

(54) GENERATOR INHIBIT SWITCH

(71) Applicant: RF INDUSTRIES, LTD., San Diego, CA (US)

(72) Inventor: Richard De Felice, North Kingstown, RI (US)

(73) Assignee: RF INDUSTRIES, LTD., San Diego, CA (US)

( * ) Notice: Subject to any disclaimer, the term of this patent is extended or adjusted under 35 U.S.C. 154(b) by 0 days.

(21) Appl. No.: 18/927,027

(22) Filed: Oct. 25, 2024

(65) Prior Publication Data

US 2025/0141377 A1 May 1, 2025

Related U.S. Application Data

(60) Provisional application No. 63/545,733, filed on Oct. 25, 2023.

(51) Int. Cl.
*H02P 9/02* (2006.01)
*H02J 9/06* (2006.01)
(52) U.S. Cl.
CPC . *H02P 9/02* (2013.01); *H02J 9/06* (2013.01)

(58) Field of Classification Search
CPC ..................................... H02P 9/02; H02J 9/06
See application file for complete search history.

(56) References Cited

U.S. PATENT DOCUMENTS

2004/0199297 A1* 10/2004 Schaper ................ H02J 7/0049
                                                            700/287
2019/0115756 A1* 4/2019 Chong ...................... H02J 5/00

* cited by examiner

*Primary Examiner* — Sean Gugger
(74) *Attorney, Agent, or Firm* — Armis IP Law, LLC

(57) ABSTRACT

In a telecommunications machine room environment, an air quality inhibit (AQI) controller attaches to a standby generator control circuit for preventing generator maintenance operation (generator "exercise") cycles when air quality is compromised according to an air quality directive restricting non-emergency IC (internal combustion) engine operation. Routine generator cycles for preventative maintenance, normally scheduled on a periodic basis, are suppressed based on an IoT (Internet of Things) device receiving an inhibit signal resulting from air quality issues. Intended emergency generator operation, due to power outage and brownout conditions, remains uninterrupted so that the air quality signal will not interfere with a true emergency calling for generator support.

14 Claims, 6 Drawing Sheets

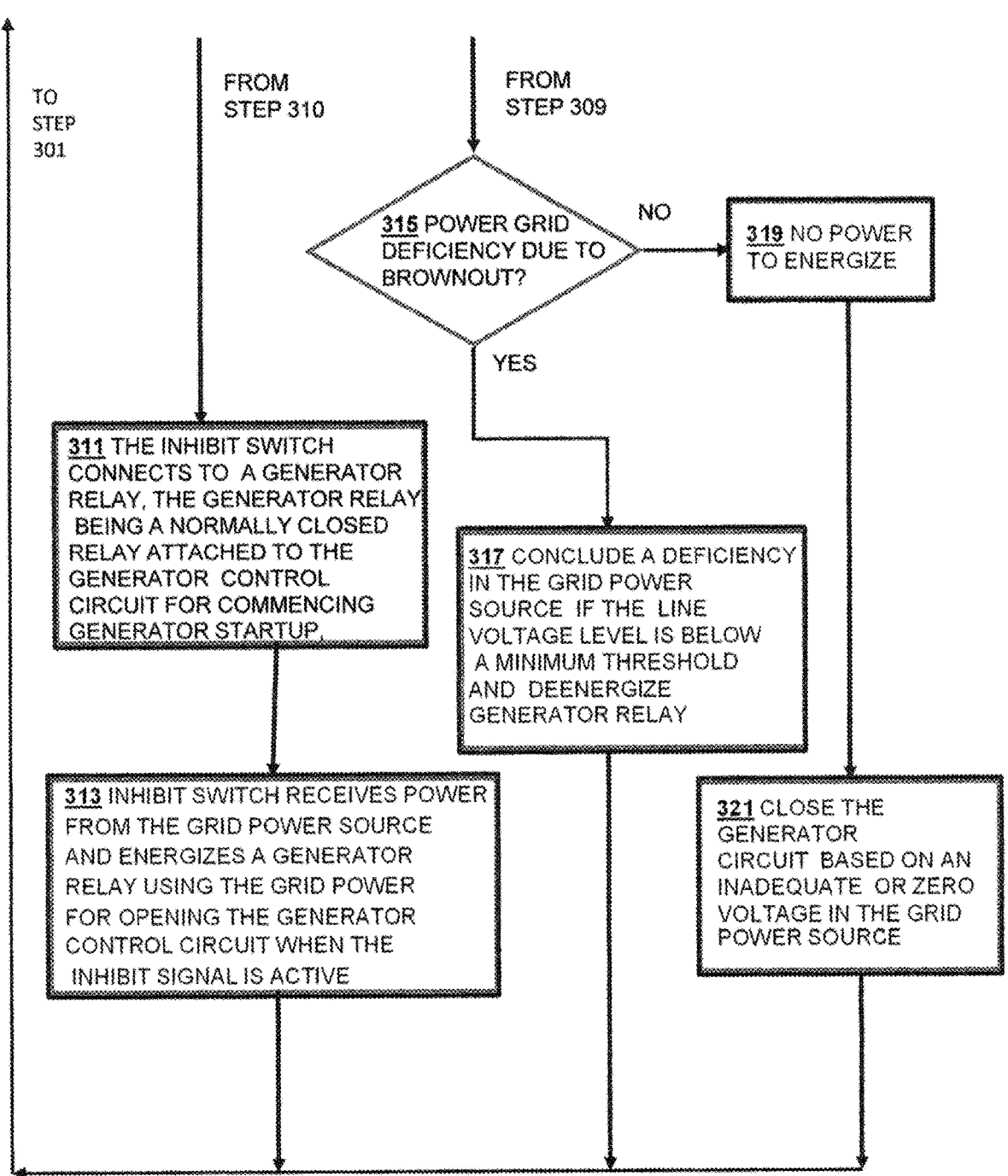

TO
STEP
301

FROM
STEP 310

FROM
STEP 309

315 POWER GRID DEFICIENCY DUE TO BROWNOUT?

NO

YES

319 NO POWER TO ENERGIZE

311 THE INHIBIT SWITCH CONNECTS TO A GENERATOR RELAY, THE GENERATOR RELAY BEING A NORMALLY CLOSED RELAY ATTACHED TO THE GENERATOR CONTROL CIRCUIT FOR COMMENCING GENERATOR STARTUP.

317 CONCLUDE A DEFICIENCY IN THE GRID POWER SOURCE IF THE LINE VOLTAGE LEVEL IS BELOW A MINIMUM THRESHOLD AND DEENERGIZE GENERATOR RELAY

313 INHIBIT SWITCH RECEIVES POWER FROM THE GRID POWER SOURCE AND ENERGIZES A GENERATOR RELAY USING THE GRID POWER FOR OPENING THE GENERATOR CONTROL CIRCUIT WHEN THE INHIBIT SIGNAL IS ACTIVE

321 CLOSE THE GENERATOR CIRCUIT BASED ON AN INADEQUATE OR ZERO VOLTAGE IN THE GRID POWER SOURCE

Fig. 3B

Generator Start Inhibit Device State Machine

| State | Description | IOT Inhibit | 240VAC | Brownout | Gen Start | Final State Description |
|---|---|---|---|---|---|---|
| 1 | Normal Operation | N | Y | N | Y | Generator Start not inhibited |
| 2 | Power Outage | N | N | N/A | Y | Generator Start not inhibited |
| 3 | Brown Out Condition | N | Y | Y | Y | Generator Start not inhibited |
| 4 | Generator Start Inhibited Remotely | Y | Y | N | Inhibit | Gen Start Inhibited |
| 5 | Generator Start Inhibited Remotely with Power Outage | Y | N | N/A | Y | Generator Start not inhibited |
| 6 | Generator Start Inhibited Remotely with Brown Out Condition | Y | Y | Y | Y | Generator Start not inhibited |
| 7 | IOT Device Fail (Fail Safe to Not Inhibited) | N | Y | N | Y | Generator Start not inhibited |
| 8 | IOT Device Fail & Power Outage (Fail Safe to Not Inhibited) | N | N | N/A | Y | Generator Start not inhibited |
| 9 | IOT Device Fail & Brown Out Condition (Fail Safe to Not Inhibited) | N | Y | Y | Y | Generator Start not inhibited |
| 10 | IOT Device Fail (Fail Not Safe & remain inhibited - e.g. contact welds) | Y | Y | N | Y | Gen Start Inhibited |
| 11 | IOT Device Fail & Power Outage (Fail Not Safe - inhibited) | Y | N | N/A | Y | Generator Start not inhibited |
| 12 | IOT Device Fail & Brown Out Condition (Fail Not Safe - inhibited) | Y | Y | Y | Y | Generator Start not inhibited |
| 13 | IOT Device Hacked to Inhibit Continuously | Y | Y | N | Inhibit | Gen Start Inhibited |
| 14 | IOT Device Hacked to Inhibit Continuously & Power Outage | Y | N | N/A | Y | Generator Start not inhibited |
| 15 | IOT Device Hacked to Inhibit Continuously & Brown Out Condition | Y | Y | Y | Y | Generator Start not inhibited |

Fig. 4

GENERATOR INHIBIT SWITCH

RELATED APPLICATIONS

This patent application claims the benefit under 35 U.S.C. § 119(e) of U.S. Provisional Patent App. No. 63/545,733, filed Oct. 25, 2023, entitled "GENERATOR INHIBIT SWITCH," incorporated herein by reference in entirety.

BACKGROUND

Portable and fixed generators are commonly used to provide reliable backup power when commercial power from the grid is unavailable, often referred to as blackouts and brownouts. Many such generators are set up with automatic transfer switches (ATS) that run the generator during outages. The ATS also periodically exercises the generator to ensure that it doesn't sit idle for extended periods and will operate as expected when it is required to run. The periodic exercise function is typically implemented via a program that is part the ATS control or via a separate controller that is attached to the ATS.

Environmental protection laws exist and are being contemplated by municipalities and states that restrict when generators may be permitted to be exercised. For example, several states have passed laws that impose fines on generator owners/operators when the generators are exercised on days when air quality alerts have been issued. To avoid risking fines, owners/operators must re-program the ATS to halt routine exercising of the generator and then re-program it again when the air quality alert has ended. This process is time consuming and typically requires visiting every site. For service providers that maintain many generators at disperse and remote sites (such as telecommunication network providers who are required to ensure the network will remain operational during emergencies), it is not feasible to visit every site to alter generator exercise scheduling. Further the corporate security policies of such companies often prohibit remote reprogramming of critical equipment in order to minimize the risk of malicious damage to the network.

SUMMARY

In a telecommunications machine room environment, an air quality inhibit (AQI) controller attaches to a standby generator control circuit for preventing generator maintenance operation (generator "exercise") cycles when air quality is compromised according to an air quality directive restricting non-emergency IC (internal combustion) engine operation. Routine generator cycles for preventative maintenance, normally scheduled on a periodic basis, are suppressed based on an IoT (Internet of Things) device receiving an inhibit signal resulting from air quality issues. Intended emergency generator operation, due to power outage and brownout conditions, remains uninterrupted so that the air quality signal will not interfere with a true emergency calling for generator support.

To avoid the risk of significant fines for violations of environmental protection laws, a solution is required that enables the ability to remotely prevent generators from exercising whilst also complying with network security protocols.

Configurations herein are based, in part, on the observation that telecommunications and networking equipment is often covered by standby electric generators coupled with an automatic transfer switch (ATS) for equipment enclosures and machine room structures that invoke environmental HVAC controls to maintain the networking equipment at proper operating temperatures and humidity. While the networking equipment itself may be covered by an uninterruptable power supply (UPS) to avoid a need to reboot in the event of a power failure, machine room HVAC controls need to be reestablished shortly after power interruption to ensure continuous, uninterrupted operation of the telecommunication (telecoms) equipment.

The machine rooms and enclosures are often unstaffed, so smooth generator transition via the ATS is imperative in a power failure to avoid equipment overheating and malfunction. Unfettered operation is further assured by regular, periodic generator exercising that operates the generator to avoid stagnation and degradation from non-use. Generator exercise is often performed simply upon fixed time intervals, such as weekly or monthly, and is typically automated. In some instances, it is desirable to avoid unnecessary operation of generators driven by fossil fuels during periods of low or compromised air quality. Certain governing entities, such as local, county or state governments and/or related entities promulgate air quality alerts/air quality issue notifications to deter such non-essential operation such as generator exercise, for activities which could be deferred to another period of less vulnerable air quality. Unfortunately, conventional approaches to generator exercise suffer from the shortcoming that generator scheduling is not amenable to recognizing air quality alerts and adjusting a generator exercise schedule in response. Telecoms operators can face fines or sanctions for inadvertently permitting routine generator exercise during periods designated as an air quality alert.

Accordingly, configurations herein substantially overcome the above shortcomings with generator exercising by providing an interface for remotely receiving air quality alerts, and suppressing generator operation during a period of compromised air quality. It may be further recognized that simply disabling generator operation is not desirable in the event of a power outage or brownout, when generator operation meets the emergency criteria for operation even during an air quality alert.

In further detail, configurations herein provide a generator control circuit, including a generator control interface for commencing generator startup via a generator control circuit, and an interface to a grid power source. A network device, such as an Internet conversant IoT (Internet of Things) device is responsive to an inhibit signal, such that the inhibit signal is indicative of a need to suppress generator operation due to air quality or other causes. An inhibit switch and inhibit logic are responsive to the inhibit signal to prevent generator startup upon receipt of the inhibit signal during normal conditions, and allows an override of the inhibit signal to energize the generator control interface and allow emergency generator operation despite the inhibition order when a deficiency in the grid power source is detected.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIGS. 3A and 3B are a flowchart of generator control using the circuit of FIG. 2;

FIG. 4 is a state list of operating states of the circuit of FIG. 2; and

DETAILED DESCRIPTION

Figure 1:
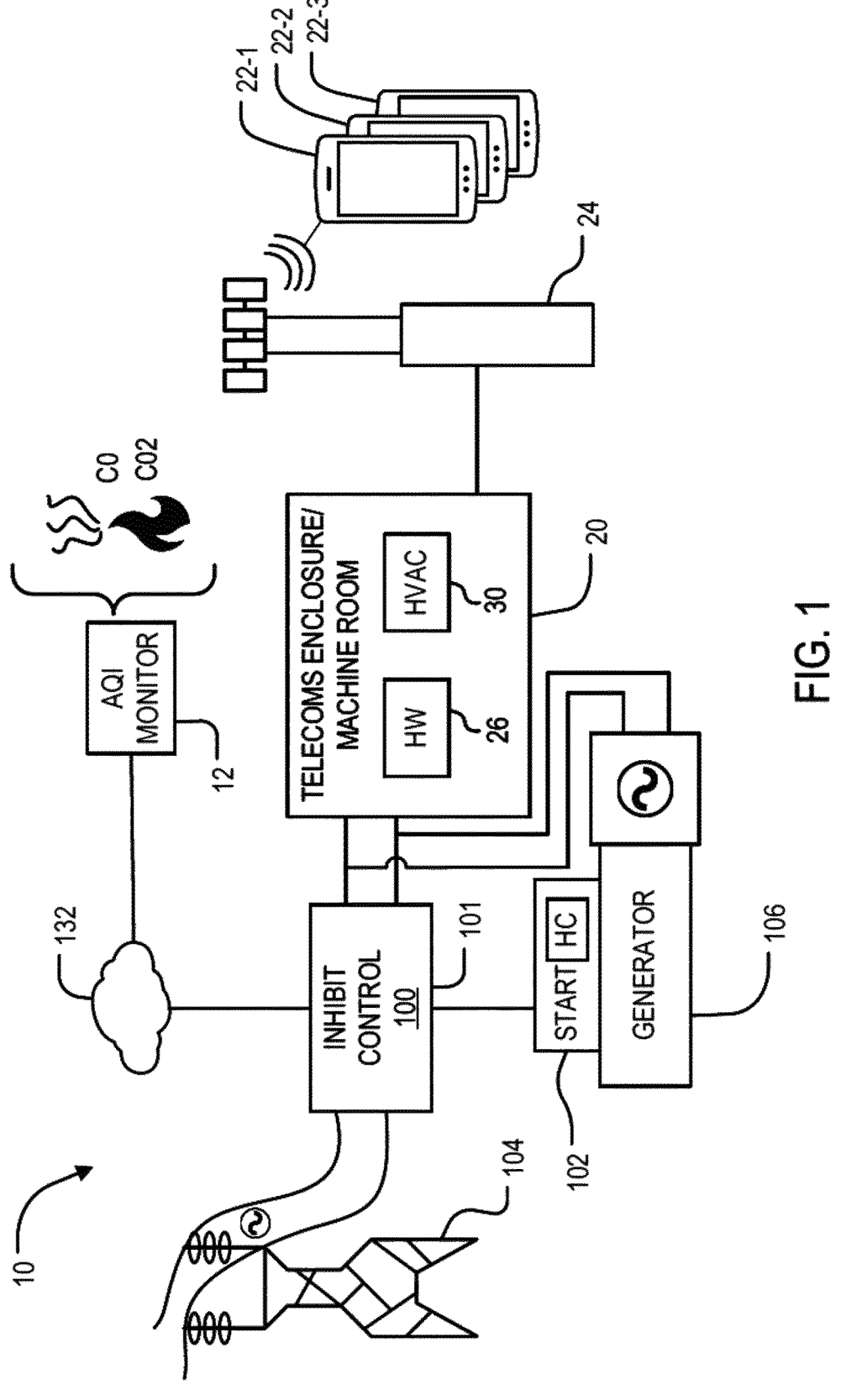
FIG. 1 is a context view of a telecommunications operating environment amenable to generator support using the disclosed approach.

An example configuration of a standby/emergency generator covering a machine room or enclosure follows. Various arrangements of generators, ATS, and generator control circuits as disclosed and claimed herein may be envisioned. FIG. 1 is a context view of a telecommunications operating environment 10 amenable to generator support using the disclosed approach. In the environment 10, a telecommunications machine room or enclosure 20 houses electronics and hardware 26 for providing telecommunications services to user devices 22-1 . . . 22-3 via antenna 24, Internet, telco (telephone twisted pair) lines and other suitable mediums. An HVAC system 30 provides environmental controls such as air conditioning and heating to maintain the hardware at an optimal temperature. A standby generator 106 connects to the machine room 20 for powering the HVAC system 20 and optionally the telecommunications hardware 26, if needed. A grid power source 104 and interface provides incoming AC power at single or three-phase 120/240/480 V as appropriate for the HVAC system 30. A generator control circuit 102 commences generator 106 operation in the event of grid power source 104 failure, typical by engaging a starter for a diesel engine.

Figure 2:
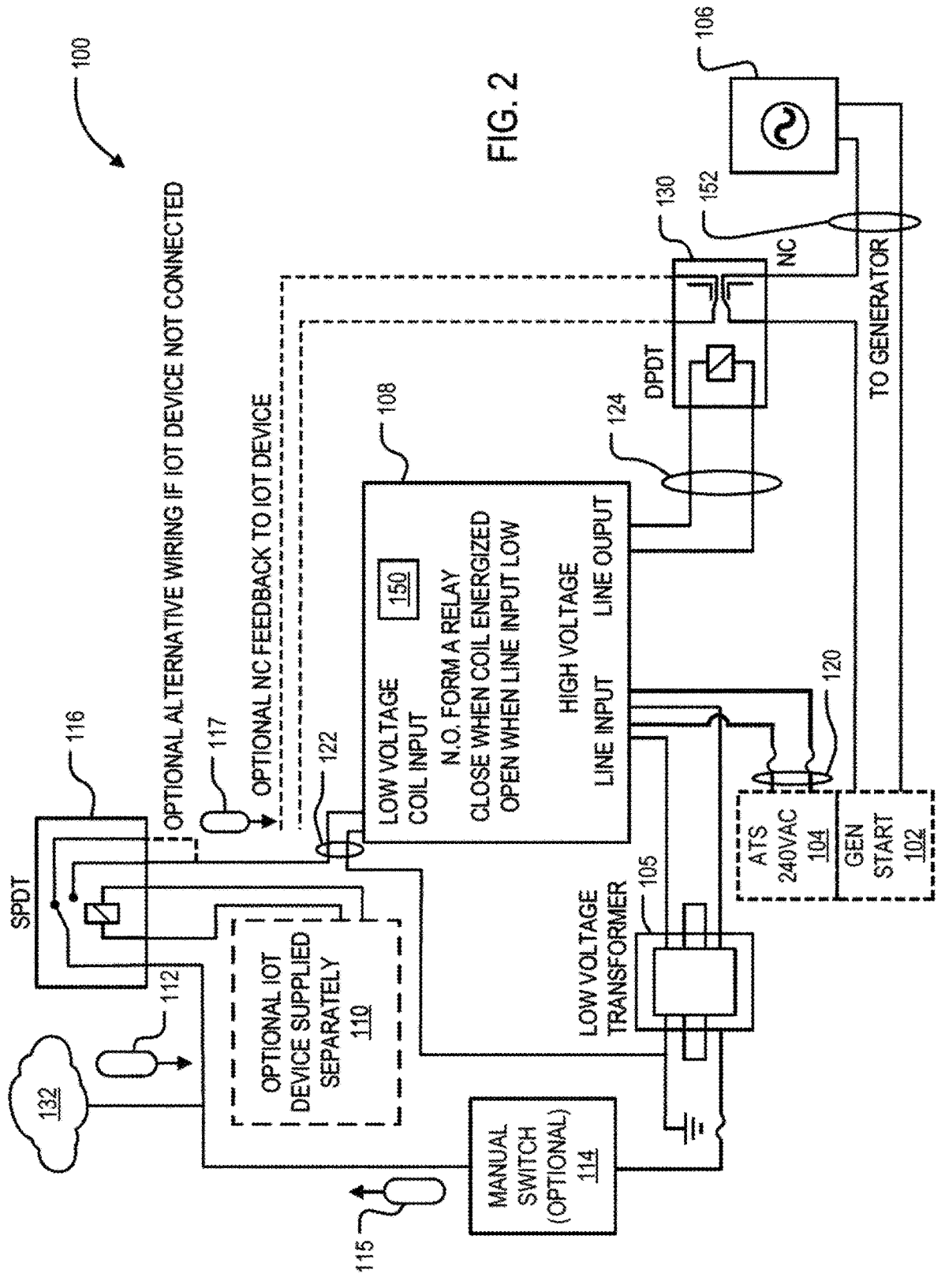
FIG. 2 is a schematic of a generator control circuit for deferring non-emergency generator operation in the environment of FIG. 1.

FIG. 2 is a schematic of a generator control circuit for deferring non-emergency generator operation in the environment of FIG. 1. Referring to FIGS. 1 and 2, configurations herein employ a power switching device 100 overseeing a generator control circuit 102 and an interface to a grid power source 104. A network device 110 is responsive to an inhibit signal 112 indicative of a need to suppress generator 106 operation, and is in communication with an on-site cabinet or utility box 101 housing the power switching device 100. The network device 110 connects to a public access network 132 for receiving an AQI (Air Quality Issue) alert from a remote governing or regulatory body. Inhibit logic 150 is configured to prevent generator 106 operation upon receipt of the inhibit signal 112, but also to override the inhibit signal and energize the generator control circuit 102 when a deficiency in the grid power source 104 is detected.

The inhibit logic 150, in a particular configuration, further comprises an inhibit switch 108 operable for detecting a high voltage 120 signal and a low voltage signal 122, where the switch has logic for passing the high voltage signal when the low voltage signal is enabled and the high voltage signal meets a threshold voltage above a brownout level. An enable coil, such as a relay, prevents unintended generator inhibition using a NC (normally closed) switch connected to the generator control circuit, such that a power failure will not restrict generator operation as the normally closed position of the enable coil in a generator relay 130 sets the default (no power) state. This fail safe or override signal 124 is operable for opening the NC switch when the grid power source is sufficient and normal air quality based suppression of generator "exercise" operation should be prevented.

Such a deficiency in the grid power source 104 includes a power outage or a brownout situation, where the brownout situation is defined by the grid power source falling below a minimum predetermined voltage, such as 180 volts of a 240 v grid connection. This threshold is based on a level below which equipment damage may occur. A three phase approach 100' (FIG. 5, below) may include a monitoring across legs 1-2 and 1-3 of a three phase grid source, where a dedicated inhibit switch 108-1 . . . 108-2 monitors each leg. A corresponding enable coil/generator relay 130-N may define a series of relays on the generator control circuit 102, such that a deficiency (low voltage) on any or all legs will be considered a brownout.

A manual override such as a switch 114 suppresses the inhibit signal from interrupting the generator control circuit by terminating the low voltage signal to the inhibit switch 108, thus allowing normal generator exercise cycles without reprogramming the generator exercise controls. This is a manual switch located on-site adjacent the equipment for technician operation. A low voltage transformer 105 connects to the grid interface 104 for providing a low voltage signal line for an inhibit relay 116 triggered by the network IoT device 110. During operation, with the switch 114 closed, the inhibit relay 116 closes upon receipt of the inhibit signal 112, to disable non-emergency generator operation (exercising). With the low voltage signal 122 asserted and adequate (non-brownout) high voltage 122, logic 108 pulls the coil 130 open for disabling generator operation. Upon a power failure or brownout, there is no high voltage and override signal 124 is not asserted, reverting NC coil 130 to an unenergized, closed state allowing generator starting. Similarly, if the inhibit signal is not asserted, the override signal is low (unasserted) allows generator operation.

Figure 3A:
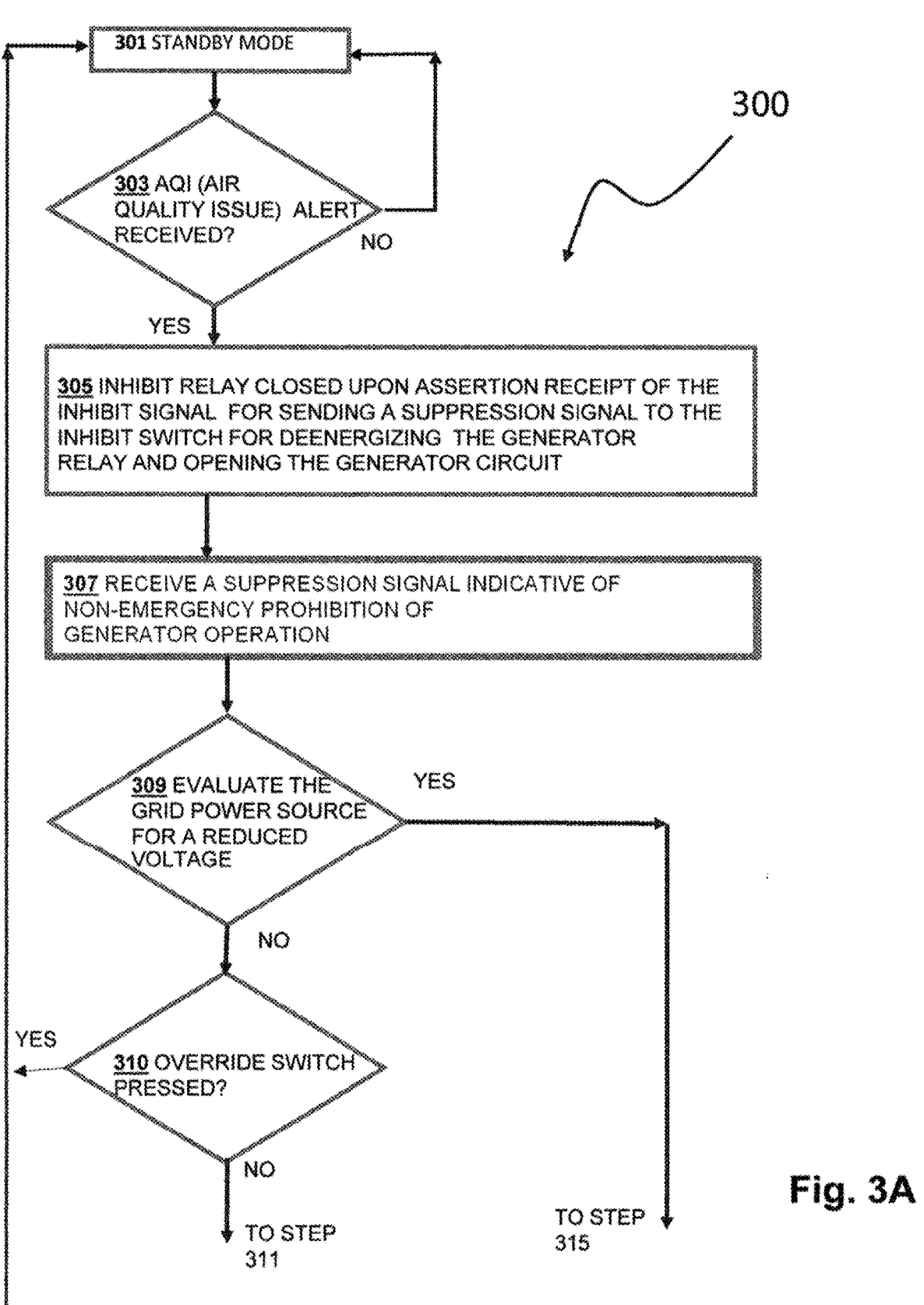

FIGS. 3A and 3B are a flowchart 300 of generator control using the circuit of FIG. 2. Referring to FIGS. 1-3, at step 301, the generator is in a standby mode and periodically polls or checks for receipt of an air quality issue/alert (AQI) indication. The network device 110 is responsive to the public access network 132 or other mechanism for receiving the AQI (Air Quality Issue) alert, and receives such an inhibit signal 112, as depicted at step 303. The AQI alert may be automated through an Internet communication from an established authority, and it is presumed that appropriate safeguards against spoofing, spamming or otherwise triggering a false AQI alert are considered and handled at the network level. A manual AQI alert, such as an email or phone call, may also commence the AQI handling.

Upon receipt of the AQI indication 112, at step 305, the inhibit relay 116 closes for sending a suppression signal 117 to the inhibit logic 150 at the inhibit switch 108. The generator control circuit 100 includes a generator relay 130, where the generator relay is a normally closed (NC) relay for allowing generator startup when the grid power source is nonexistent. The inhibit relay 116 is connected to the inhibit switch 108, such that the inhibit relay 116 is closed upon receipt of the inhibit signal 112 for sending the suppression signal 117 to the inhibit switch for deenergizing the generator relay 130 and opening the generator power circuit 152. It should be noted that this refers to the connection for starting the generator 106, usually a diesel engine, not the power produced by the generator once started.

Once the inhibit relay 116 is closed, the inhibit logic 150 evaluates the grid power source 104 for a reduced voltage indicative of a deficiency. During periods of normal operation, meaning adequate grid power is available and there is no need for emergency power generation, the inhibit switch 108 receives the suppression signal 117 indicative of non-emergency prohibition of generator operation, and opens a generator power circuit 152 that suppresses the generator control interface upon assertion of the suppression signal when grid power is not deficient.

At step 310, the override switch 114 is examined for a manual override of the generator suppression. This forces generator capability even if the inhibit logic 150 seeks to suppress it. The generator relay 130 includes the enable coil for preventing unintended generator inhibition, typically a NC (normally closed) switch or relay connected to the generator control circuit, whereas override signal closes the NC switch when the grid power source is sufficient. The manual override from the override switch 114 triggers an override signal 115 suppressing the inhibit signal from interrupting the generator power circuit 152. In the example configuration, the override switch 114 cuts power to the inhibit relay 116 to nullify the suppression signal 117.

In the likely absence of an override, the inhibit switch 108 receives the suppression signal 117. The inhibit switch 108 connects to a generator relay 130. The generator relay 130 is a normally closed relay attached to the generator power circuit 152 for commencing generator startup, as depicted at step 313. With power applied to the enable coil of the generator relay 130, the NC relay is opened, cutting power to the generator power circuit 152, thereby disabling the generator 106.

If the check at step 309 indicates a compromised grid power source 104, the result could be a brownout (low voltage) or outright failure (grid power outage). At step 315, the inhibit logic 150 checks if the deficiency in the grid power source 104 includes a power outage or a brownout situation. The inhibit switch 108 is configured for detecting a high voltage signal and a low voltage signal, and includes logic for passing the high voltage signal when the low voltage signal is enabled and the high voltage signal meets a threshold voltage. The low voltage signal is the suppression signal 117 based on assertion (closure) of the inhibit relay 116. The high voltage signal is the grid power source 104. The inhibit switch 108 receives power from the grid power source 104 and energizes the generator relay 130 using the grid power for opening the generator control circuit when the inhibit signal is active (step 313) and deenergizes the generator relay 130 for closing the generator control circuit when the grid power falls below a threshold voltage, as depicted at step 317. The inhibit switch 108 is configured to determine sufficiency of the grid power 104 by measuring a line voltage level of the grid power source 104, and concluding a deficiency in the grid power source 104 if the line voltage level is below a minimum threshold. Most AC sources are 120 V or 240 V nominal, with a slight variation due to demand, power factors on the transmission lines, etc. Some equipment can be damaged by operating at an excessively low voltage in a brownout condition, say 80 or 90 volts for example. Even though there may be sufficient power to operate the generator relay 130, the inhibit logic 150 will construe a low power "brownout" condition as an emergency allowing generator 106 start and operation despite an AQI warning. In other words, even though the inhibit switch 108 has sufficient power to open the generator relay 130 and suppress generator operation, it will instead allow the generator relay 130 to close and permit generator operation. The brownout situation is therefore defined by the grid power source 104 falling below a minimum predetermined voltage.

In contrast, if there is an outright grid outage, at step 315, the inhibit switch, inhibit relay and generator relay cannot operate due to lack of power, irrespective of a voltage comparison by the inhibit switch 108/inhibit logic 150, i.e. voltage is zero. In such a case, the generator relay 130 is deenergized for closing the generator power circuit 152 based on an inadequate or zero voltage in the grid power source 104. Due to the NC characteristic of the generator relay 130, the generator control circuit is closed when the grid power source 104 is disabled.

FIG. 4 is a state list of operating states of the circuit of FIG. 2, and tracks the inhibit logic 150 described above for the state variables for IoT enable 402, based on the inhibit signal 112, 240 VAC signal 404, indicative of the grid power source 104, a brownout state 406, based on the voltage threshold measured by the inhibit switch, and the generator start conclusion 408, based on power to the enable coil of the generator relay 130, meaning whether the enable coil should be pulling the circuit open and thus disabling generator start.

Figure 5:
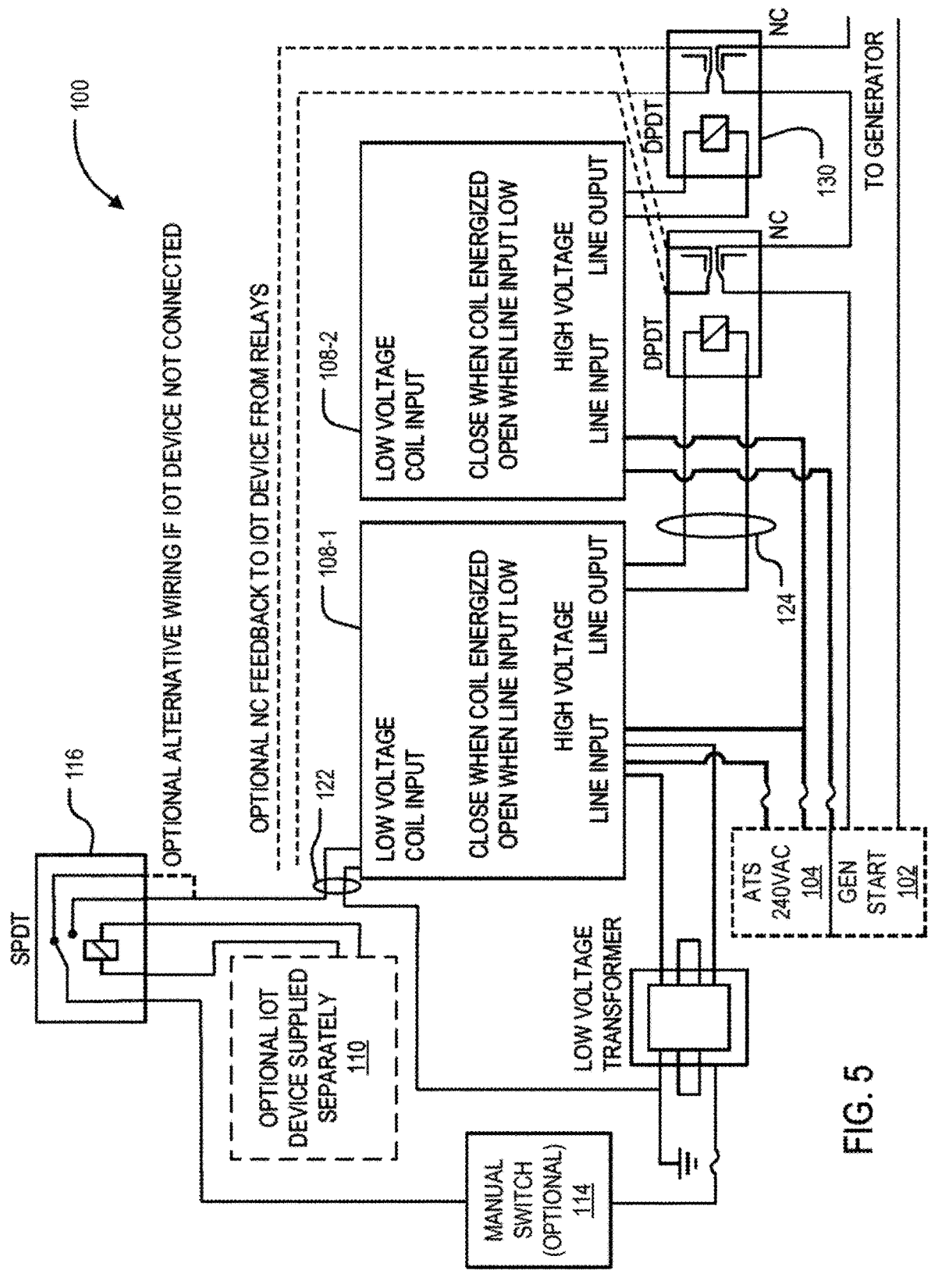
FIG. 5 is an alternate configuration of the generator control circuit of FIG. 2 for use at machine rooms with 3-phase grid sources.

FIG. 5 is an alternate configuration 100' of the generator control circuit of FIG. 2 for use at machine rooms with 3-phase grid sources. The 3 phase operation follows similar inhibit logic 150, except that there are two generator relays, 130-1 and 130-2, in series with the generator power circuit 152. Thus, at least two legs of the three phase grid source would need to indicate a grid power deficiency, as if either inhibit switch 108-1, 108-2 concluded an inhibit state, the inhibit coil of the generator relay would be energized and pulled open, opening the generator power circuit 152.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A generator control circuit, comprising:
   a generator control interface for commencing generator startup via a generator control circuit;
   an interface to a grid power source;
   a network device, the network device responsive to an inhibit signal, the inhibit signal indicative of a need to suppress generator operation;
   an inhibit switch, the inhibit switch responsive to the inhibit signal to prevent generator startup upon receipt of the inhibit signal, and override the inhibit signal to energize the generator control interface when a deficiency in the grid power source is detected, the inhibit switch further comprising:
   an enable coil for preventing unintended generator inhibition, including
       a NC (normally closed) switch connected to the generator control circuit; and
       an override signal for opening the NC switch when the grid power source is sufficient.

2. The device of claim 1 wherein the inhibit switch has inhibit logic, the inhibit logic configured to:
   evaluate the grid power source for a reduced voltage indicative of a deficiency;
   receive a suppression signal indicative of non-emergency prohibition of generator operation; and
   open a circuit that suppresses the generator control interface upon assertion of the suppression signal when grid power is not deficient.

3. The device of claim 1 wherein the inhibit switch connects to a generator relay, the generator relay being a normally closed relay attached to the generator control circuit for commencing generator startup, and cannot open the generator relay when the grid power source is below a line voltage power level.

4. The device of claim 1 wherein the generator control circuit includes a generator relay, the generator relay being normally closed for allowing generator startup when the grid power source is nonexistent, further comprising an inhibit relay, the inhibit relay connected to the inhibit switch, the inhibit relay closed upon assertion of the inhibit signal for sending a suppression signal to the inhibit switch for deenergizing the generator relay and opening the generator circuit.

5. The device of claim 1 wherein the generator control circuit is closed when the grid power source is disabled.

6. The method of claim 1 wherein the deficiency in grid power source includes a power outage or a brownout situation.

7. The method of claim 6 wherein the brownout situation is defined by the grid power source falling below a minimum predetermined voltage.

8. The device of claim 1 further comprising a manual override, the manual override suppressing the inhibit signal from interrupting the generator control circuit.

9. The device of claim 1 wherein the network device is responsive to a public access network for receiving an AQI (Air Quality Issue) alert.

10. The device of claim 1 wherein the inhibit switch is configured to determine sufficiency of the grid power by:

measuring a line voltage level of the grid power source; and concluding a deficiency in the grid power source if the line voltage level is below a minimum threshold.

11. A generator control circuit, comprising:

a generator control interface for commencing generator startup via a generator control circuit;

an interface to a grid power source;

a network device, the network device responsive to an inhibit signal, the inhibit signal indicative of a need to suppress generator operation; and an inhibit switch, the inhibit switch responsive to the inhibit signal to prevent generator startup upon receipt of the inhibit signal, and override the inhibit signal to energize the generator control interface when a deficiency in the grid power source is detected, the inhibit switch configured to receive power from the grid power source, the inhibit switch configured to energize a generator relay using the grid power for opening the generator control circuit when the inhibit signal is active, and configured to deenergize the generator relay for closing the generator control circuit when the grid power falls below a threshold voltage.

12. The device of claim 11 wherein the inhibit switch deenergizes the generator relay for closing the generator circuit based on an inadequate or zero voltage in the grid power source.

13. A generator control circuit, comprising:

a generator control interface for commencing generator startup via a generator control circuit;

an interface to a grid power source;

a network device, the network device responsive to an inhibit signal received from an established authority at a remote location, the inhibit signal indicative of a need to suppress generator operation; and an inhibit switch, the inhibit switch responsive to the inhibit signal to prevent generator startup upon receipt of the inhibit signal, and override the inhibit signal to energize the generator control interface when a deficiency in the grid power source is detected, the inhibit switch configured to detect a high voltage signal and a low voltage signal, the switch having logic for passing the high voltage signal when the low voltage signal is enabled and the high voltage signal meets a threshold voltage.

14. A power switching device, comprising:

a generator control circuit;

an interface to a grid power source; and a network device responsive to an inhibit signal, the inhibit signal indicative of a need to suppress generator operation and received from an established authority at a remote location; and inhibit logic configured to:

prevent generator startup and operation upon receipt of the inhibit signal; and override the inhibit signal and energize the generator control circuit when a deficiency in the grid power source is detected, the inhibit logic connected to an inhibit switch, further comprising an enable coil for preventing unintended generator inhibition, including:

a NC (normally closed) switch connected to the generator control circuit; and an override signal for opening the NC switch when the grid power source is sufficient.

* * * * *